United States Patent
Aliev et al.

(10) Patent No.: US 8,527,465 B1
(45) Date of Patent: Sep. 3, 2013

(54) SYSTEM AND METHOD FOR MODELING DATA CHANGE OVER TIME

(75) Inventors: Artem Aliev, Sosnovi Bor (RU); Mikhail Ilyin, Saint-Petersburg (RU); Vitaly Kozlovsky, Saint-Petersburg (RU); Nikolay Vyatkin, Saint-Petersburg (RU); Misha Zelikov, Needham, MA (US)

(73) Assignee: EMC Corporation, Hopkinton, MA (US)

( * ) Notice: Subject to any disclaimer, the term of this patent is extended or adjusted under 35 U.S.C. 154(b) by 380 days.

(21) Appl. No.: 12/344,107

(22) Filed: Dec. 24, 2008

(51) Int. Cl.
*G06F 17/30* (2006.01)

(52) U.S. Cl.
USPC .......................... 707/650; 707/610; 707/630

(58) Field of Classification Search
USPC ................. 707/610, 640, 644, 650, 999.204, 707/639, 999.107, 999.203; 726/24
See application file for complete search history.

(56) References Cited

U.S. PATENT DOCUMENTS

| | | | |
|---|---|---|---|
| 5,574,906 A * | 11/1996 | Morris | 707/640 |
| 6,233,589 B1 * | 5/2001 | Balcha et al. | 707/625 |
| 6,374,250 B2 * | 4/2002 | Ajtai et al. | 1/1 |
| 6,810,398 B2 | 10/2004 | Moulton | |
| 7,487,169 B2 * | 2/2009 | Agarwal | 1/1 |
| 7,512,570 B2 * | 3/2009 | Chang et al. | 706/11 |
| 7,526,513 B2 * | 4/2009 | Lees et al. | 1/1 |
| 7,814,056 B2 * | 10/2010 | McGrattan et al. | 707/640 |
| 8,041,677 B2 * | 10/2011 | Sumner et al. | 707/640 |
| 8,280,851 B2 * | 10/2012 | Kaczmarski et al. | 707/640 |
| 2003/0135524 A1 * | 7/2003 | Cane et al. | 707/204 |
| 2006/0112264 A1 * | 5/2006 | Agarwal | 713/150 |
| 2006/0253731 A1 * | 11/2006 | Petruzzo | 714/6 |
| 2007/0150499 A1 * | 6/2007 | D'Souza et al. | 707/101 |
| 2007/0250671 A1 * | 10/2007 | Lyon | 711/162 |
| 2008/0047013 A1 * | 2/2008 | Claudatos et al. | 726/24 |
| 2008/0126431 A1 * | 5/2008 | Walliser et al. | 707/200 |
| 2008/0195676 A1 * | 8/2008 | Lyon et al. | 707/204 |
| 2008/0270396 A1 * | 10/2008 | Herscovici et al. | 707/6 |
| 2010/0049930 A1 * | 2/2010 | Pershin et al. | 711/162 |

OTHER PUBLICATIONS

Thekkath, Chandramohan A., et al., Techniques for File System Simulation Software—Practice and Experience, vol. 24(11), 981-999 (Nov. 1994).

* cited by examiner

*Primary Examiner* — Leslie Wong
(74) *Attorney, Agent, or Firm* — Dergosits & Noah LLP; Todd A. Noah

(57) ABSTRACT

The present invention is a system and method for identifying file system events over time using at least two consecutive backup images for the file system. Using consecutive backup images for the file system enables the present invention to identify whether files have been created, removed or altered between backup operations, without actually interfering or interacting with the file system itself. As a result, the information gathered may be compiled to generate a more accurate file system model for the backed up file system. As a further result, the present invention is a less invasive way to gather information about file system events.

13 Claims, 2 Drawing Sheets

SYSTEM AND METHOD FOR MODELING DATA CHANGE OVER TIME

CROSS REFERENCE TO RELATED APPLICATIONS

This nonprovisional patent application is related to co-pending U.S. patent application Ser. No. 12/344,117, filed Dec. 24, 2008, entitled, "SYSTEM AND METHOD FOR FILE SYSTEM SIMULATION," which is incorporated by reference.

FIELD

The present invention relates generally to simulating a file system, and specifically, to detecting and analyzing file system data over time in order to characterize the dynamic behavior of the file system data.

BACKGROUND

Simulating a file system using artificial data is a well-known method for predicting, studying and assessing file system performance. The generation of artificial data for a simulated file system is also known as "generating a file system model" or "modeling a file system." File system simulation is a way to recreate content similar to a "real" working file system in order to simulate changes to and interaction with the file system model (i.e., file system events) without interfering with the working file system. For example, when access to a file system data is restricted, a file system model of that restricted file system will be generated for studying, testing and development purposes. Analyzing these file system models can reveal how effectively file system storage is used and how file system data is generated and altered over time. Therefore, in order to produce more relevant analyses, it is important to have an accurate file system model that resembles the original file system as much as possible.

Having an accurate file system model is especially important for companies that design, develop and market file system hardware and software. These companies need to generate accurate file system models of their customers' data in order to create optimal file system hardware and software that best suit their customers' needs. This requires knowing the size of a customer's current file system(s), what its projected needs will be, what kind of file system events occur over time, etc. One will appreciate that file system events may include a number of operations and interactions with a file system. File system events commonly include changes made to files, directories and other file system objects. These changes may be the result of manual user actions or the result of operations performed by software applications that interact with the file system.

File system events can be categorized into several general types. A first type of file system event is known as the "file creation/deletion semantic." These changes include situations where a file system object is created or removed from the file system. A second type of file system event is an "overstrike semantic." This type of file system event is more common with large files of many gigabytes. Over time, these files tend to stay in the same location on the file system, but they may incorporate slight changes to their content. As a general principle, however, the content of these files is largely static. A third type of file system event is the "insert/cut semantic." The insert/cut semantic is more often associated with small files. These include edits and changes to files created using word processors and text editors. One will appreciate that the presence, absence or frequency of these file system events varies from customer to customer.

Since each customer's file system will experience a different combination of file system events, it is important to understand how each customer's file system is used. The customer's file system can be manually observed, or more commonly, a logger program can be installed that will record all file system events. However, customers are unlikely to provide full access to their data or permit surveillance of their data. Therefore, file system models are generated using information gathered from the customer. This information may be used to set the parameters and scope of the file system model. Alternatively, the file system company can make assumptions about their customers' file systems based upon previous experiences, or it can generate a file system model using generic parameters. However, these techniques are not very precise, and as a result, the file system model may not properly simulate how the customer actually uses its file system. As a further result, the file system company may end up providing file system hardware and software that does not exactly match the customer's needs.

What is therefore needed is a less invasive way to determine a customer's most common file system events in order to generate a more accurate file system model. Specifically, what is needed is a way to determine the type of file system events that commonly occur in the customer's file system, and how often these events occur.

BRIEF DESCRIPTION OF THE FIGURES

The present invention is illustrated by way of example and not limitation in the figures of the accompanying drawings, in which like references indicate similar elements, and in which.

DETAILED DESCRIPTION

Figure 1:
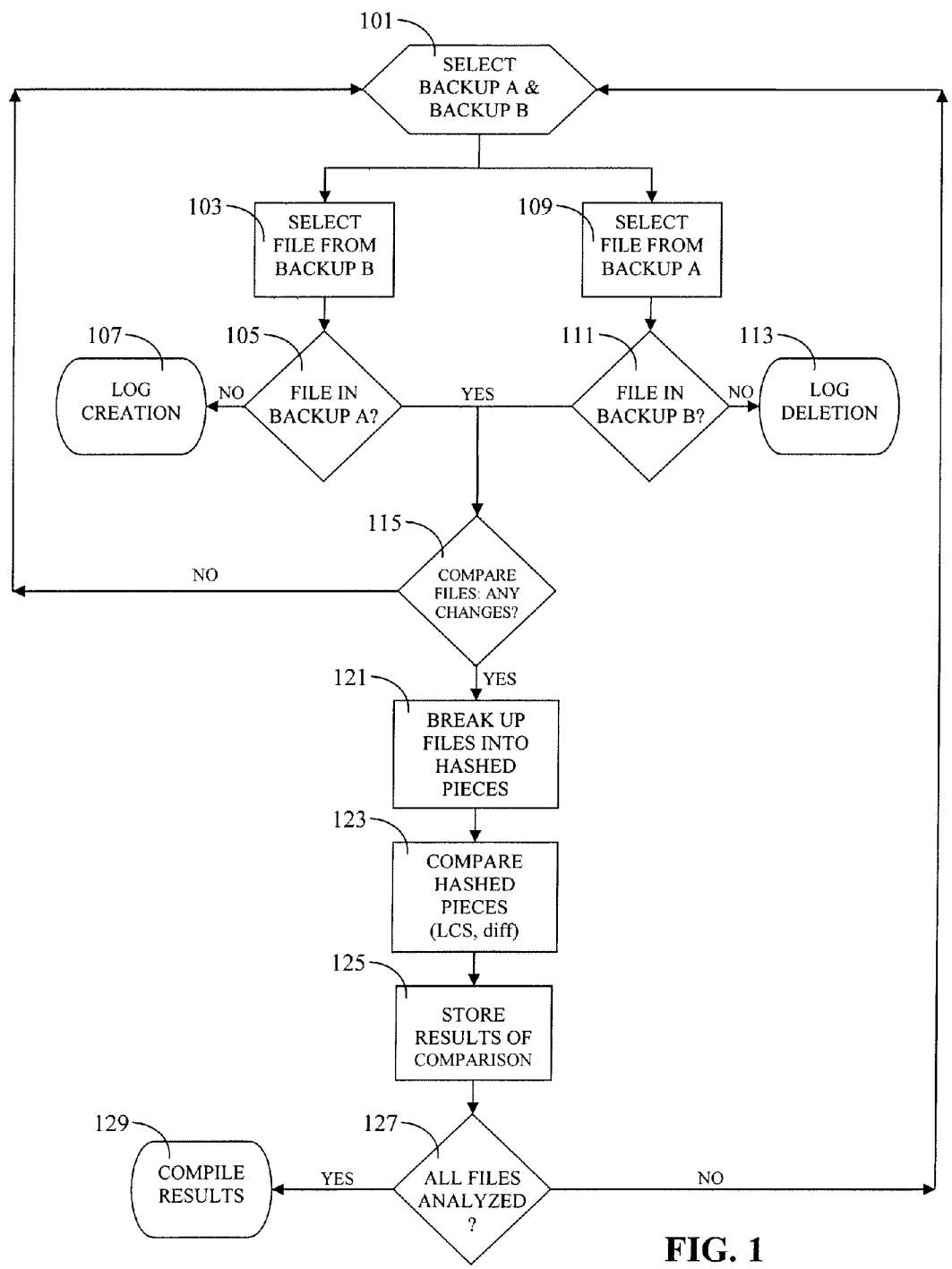
FIG. 1 is an exemplary flow diagram illustrating the steps of an embodiment of the present invention.

The present invention is an improved method for discovering file system events without interfering with the operation of the file system being studied. Instead of analyzing a file system while it is being used, an embodiment of the present invention analyzes backup images of the file system. As will be discussed in more detail below, using backup images of the file system of interest is a more accurate and less invasive way for gathering information to generate a file system model.

It should be appreciated that the present invention can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules.

Applications may be hardwired or hard coded in hardware or take the form of software executing on a general purpose computer such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

A. Exemplary Method Using Backup Images

One will appreciate that there are many ways to perform the method of the present invention, and that the examples given herein are not designed to limit the invention in any way. In an embodiment, a method may be performed by a software program. The software program may be encoded in memory as described above, and may use one or more components for performing the exemplary method. In an embodiment, the software program analyzes two backup images of the file system selected for study. Preferably, these will be consecutive backup images, in which one backup image is created during a regularly scheduled backup operation, and the other backup image is created during the next regularly scheduled backup session. A comparison of consecutive backup images may show incremental changes over a shorter time interval than a comparison of non-consecutive backups; however, one will appreciate that the present invention will work with non-consecutive backups as well. One will also appreciate that the backup images may be incrementally created backup images, full backup images, or a combination of the two.

FIG. 1 is an exemplary flow diagram showing the steps of detecting and characterizing file system events that may occur between backup operations for the file system selected for study, according to an embodiment of the present invention. In step 101, a first backup image from one backup operation and a second backup image from a subsequent backup operation are selected for comparison. For convenience, the first backup image may be referred to as Backup A, and the second backup image may be referred to Backup B. One will appreciate that Backup A and Backup B are backup images of the same file system.

One will appreciate that file system events may be detected by the present invention by either comparing Backup A to Backup B, or Backup B to Backup A. Specifically, as the examples below will illustrate, file system objects from Backup A may be compared against file system objects from Backup B (steps 109, 111 and 115). Alternatively, file system objects from Backup B may be compared against file system objects from Backup A (steps 103, 105 and 115). One will appreciate that the comparing step may be the same (step 115) regardless of whether Backup A's objects are compared to Backup B's objects, or whether Backup B's objects are compared to Backup A's objects. The decision as to whether to select Backup B's file system objects (step 103) or whether to select Backup A's file system objects (step 109) may be handled by the software program performing the method of the present invention. This decision may be determined by an administrator, may be an automatic setting, or may be part of an algorithm that ensures all file system events between Backup A and Backup B are detected. For example, the algorithm may require that all file system objects in Backup B be compared against file system objects in Backup A before comparing Backup A file system objects against Backup B. Other variations are also possible without departing from this disclosure or the scope of the present invention.

The following example describes an embodiment in which file system objects from Backup B are selected for comparison against file system objects in Backup A. In step 103, a file system object is selected from the Backup B. The object may be a file. One will appreciate that this step may require extraction or recovery of a portion of Backup B in order to allow identification of individual file system objects in the backup image. Once this file is identified and selected, then in step 105, the system will attempt to locate this file in Backup A. One will appreciate that this may also require extraction or recovery of a portion of Backup A. If the file is not found in Backup A, then in step 107, the system will log that this file was newly created on the file system between Backup B and Backup A. This information may be stored in a table, database or other data structure for later reference by the software program performing the method of the present invention. The process may then repeat at step 101 with a different file system object from Backup B, or may continue by comparing file system objects in Backup A against file system objects in Backup B, as discussed further below.

If the file selected from Backup B ("Backup File B") is found in Backup A ("Backup File A"), then in step 115, the present invention performs a comparison of the two files. In step 115, Backup File B and Backup File A will be compared to determine if the files have changed between backup operations. If the files have not changed between backup operations, then the comparison analysis will stop, and the software program performing the method of the present invention may repeat the method from step 101. As previously mentioned, this may mean continuing to step 103 with a different file selected from Backup B, or proceeding to step 109 with a file selected from Backup A.

If in step 115, the software program does detect that there are differences between Backup File B and Backup File A, then the software program will characterize those differences, thereby identifying the file system event that may have occurred between backup operations. In step 121, Backup File B and Backup File A may be broken up into smaller data pieces. In an embodiment, step 121 may be performed using the digital sequence breakup method disclosed in U.S. Pat. No. 6,810,398, which is owned by the assignee of the present invention and incorporated in full herein. Unlike U.S. Pat. No. 6,810,398, which discloses breaking up a single file into data pieces, the present invention requires that both Backup File A and Backup File B be broken up into respective data pieces. In an embodiment, Backup File A and Backup File B may be broken up into data pieces using a hash function. For example, after step 121 is performed, Backup File A will be broken up into one sequence of data piece hashes, and Backup File B will be broken up into a second sequence of data piece hashes. The data piece hashes from Backup File A will then be compared against the data piece hashes from Backup File B (step 123).

The hash comparison will confirm and find the exact differences between the two sequences of data piece hashes. The present invention may then perform an algorithm or run a script that characterizes the differences by determining what steps may have been taken to transform the sequence of hashes from Backup File A to the sequence of hashes from Backup File B. In an embodiment, this algorithm may be based on solving the longest common subsequence ("LCS") problem.

One will appreciate that files may also be compared byte by byte without applying a hash function. However, comparing broken up data piece hashes may be more efficient. This is because the backup files left in their original format may be complex or may be of different length, thereby complicating the comparison. Use of a hash function helps to standardize the file sizes as well as the level of complexity between Backup File A and Backup File B.

Instead of or in addition to solving the LCS problem, step 123 may involve the application of the "diff" file comparison utility. Other applications may also be used so long as the application is able to compare, detect and characterize the changes between the files, i.e., file system events. Regardless of the type of file comparison performed, the results of the file comparison may be stored in a change log or other temporary memory buffer or data structure (step 125). This data structure may include information about newly created objects from step 107, or deleted objects from step 113 (discussed further below). In step 127, the software program performing the method may check to see if all file system objects in both backup images have been compared. If not, then in an embodiment, the process may repeat starting at step 101 until all file system objects in Backup B are compared against Backup A, and/or all file system objects in Backup A are compared against Backup B.

In an embodiment, the software program may be configured to only analyze a portion of all available file system objects in Backup A and Backup B, or may be limited to only compare Backup B objects against Backup A, or may be set to detect and compare enough of a sampling of the file system objects the change log has a sufficient amount of information in order to compile the data in step 129. One skilled in the art will recognize that not all file system objects in Backup A and Backup B need to be analyzed.

In step 129, all of the data from the data structure stored in step 125 may be compiled to provide information necessary for generating an accurate file system model. This information may include, but is not limited to, the distribution of the file system object sizes, the distribution of file system object types, the distributions of file system object changes between each backup operation, the distribution of file system object movement or location-changes between each backup operation, etc. Once these factors are compiled, they may be outputted to a file system model generator, such as that described in co-pending U.S. patent application Ser. No. 12/344,117. This information may be used to generate a file system model that takes all of these factors into account. In addition, this information may be displayed on a graph or similar display, thereby providing a visual output that summarizes the types of file system events. As such, the present invention does not merely identify file system events, but also characterizes them in order to provide usable information for file system analysis.

The above example illustrated a situation in which file system objects are selected from Backup B in step 103, and located in Backup A in step 105. As previously mentioned, the present invention can also compare file system objects from Backup A to file system objects from Backup B. The process is similar to steps 103 and 105, with some significant differences. For example, in step 109, a file is selected from Backup A, and in step 111, the system will attempt to locate this file in Backup B. If this file is not found, then in step 113, the system will log that this file was deleted from the file system between Backup A and Backup B. This log may be the same data structure as that which stores information from steps 107 and 125. One will appreciate that steps 109 and 111 may be performed before, simultaneously with or after steps 103 and 105, and that the order of operations shown in FIG. 1 is merely exemplary and not meant to be limiting in any way.

One will appreciate that even though Backup B lacks the file system object selected from Backup A, this may not mean there was a file deletion between backup operations. For example, in an embodiment, Backup A may be a full backup, and Backup B may be an incremental backup. One will appreciate that incremental backups may only backup files that have been modified since the previous backup. Therefore, if the file from full Backup A has not been modified before Backup B is created, the file from full Backup A may not be found in incremental Backup B. In such a case, the software program performing the method will not log that this file was deleted from the file system between Backup A and Backup B. Instead, the process may begin again at step 101 with a different file system object. As previously discussed, beginning again at step 101 may involve selecting a file from Backup A to compare against a corresponding file in Backup B (steps 109 and 111), or may involve comparing a file from Backup B against a corresponding file in Backup A (steps 103 and 105).

If the file selected from Backup A is located in Backup B, then the files may be compared to detect if there are any differences (step 115). If there are differences between the file selected from Backup A and the corresponding file in Backup B, then the comparison continues from step 121 as described above using the "diff" utility or solving the LCS problem.

The method embodiment of the present invention described above and shown in FIG. 1 thereby provides a method for gathering information to create a more accurate file system model. By using a file system's backup images, the present invention provides an analysis for actual file system activity, without actually interfering with the file system while it is in use. One will appreciate that the more backup images are included in the analysis, the more accurate the information may be. One will also appreciate that the present invention will work with archived or copied versions of a file system, as well as with files or data objects within the file system. For example, variations of the method disclosed below may be used to characterize changes between two versions of a file. Previous file comparison programs are able to identify the differences between two versions of a file using the "diff" utility or other variant; however, the present invention actually characterizes identified changes between files and between entire file systems.

One will appreciate that the present invention can function on any number of computing platforms. For example, in an embodiment shown in FIG. 2, the present invention may be a software program or application stored in memory and run on a computer 222 having access to a network. The software application embodiment may therefore be able to perform the method described above, so long as it has access to at least two backup images for comparison, and/or two versions of a file for comparison. As such, the platform should have sufficient memory and resources to perform the analysis, and store the results of the comparison, as well as the computer program code in order to perform the method described above.

Figure 2:
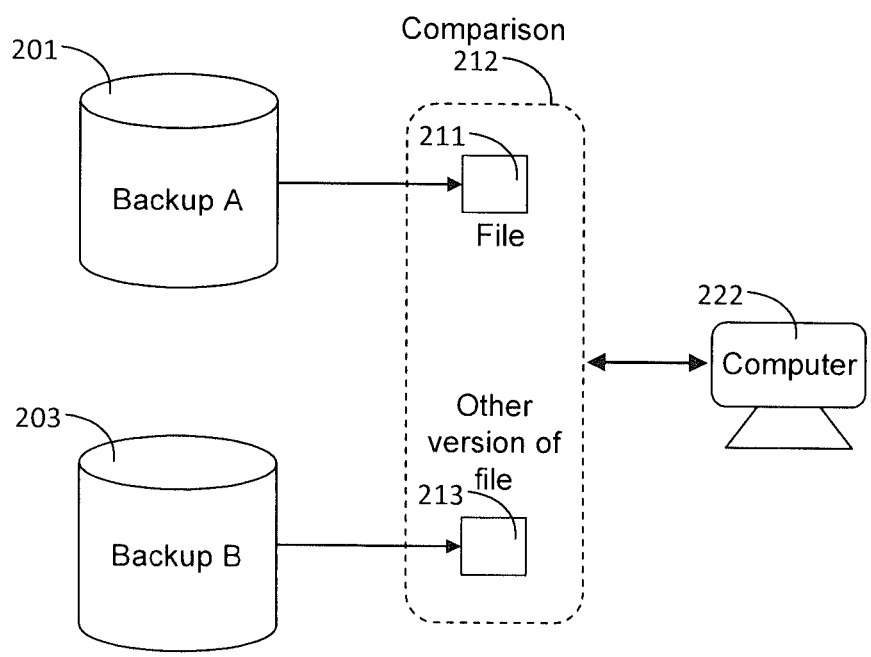
FIG. 2 is an exemplary block diagram depicting one embodiment of the present invention.

In FIG. 2, 201 may be a first backup image (Backup A) and 203 may be a second backup image (Backup B). In this case, 211 may be a file selected from Backup A and 213 may be another version of the file from Backup B. Computer 222 may analyze files 211 and 213 by performing a comparison 212 of the two.

In an embodiment, files 211 and 213 may not backed up files, but merely two versions of the same file. In this embodiment, files 211 and 213 may be selected from single file system, instead of from Backup A and Backup B, respectively. Other system configurations are also possible without departing from the scope of this disclosure.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A method for analyzing file system events comprising:
    receiving, by a system for analyzing file system events, a first backup image of a file system, the first backup image having at least one backed up file system object;
    receiving, by the system for analyzing file system events, a second backup image of the file system, the second backup image having at least one backed up file system object, the second backup image created after the first backup image;
    selecting a first file system object from the first backup image; and
    comparing the first file system object and a second version of the first file system object to determine the difference if the second version of the first file system object is located in the second backup image, if the second version of the first file system object is not located in the second backup image, then determining that the first file system object was deleted from the file system or was created in the file system at a time interval between a creation of the first backup image and a creation of the second backup image; and
    using the results from the comparing step to generate a model of the file system.

2. The method of claim 1, further comprising storing the results from the determining step in a data structure.

3. The method of claim 1, wherein determining comprises:
    applying a hash function to the first file system object from the first backup image to generate a first hash result;
    applying a hash function to the second version of the first file system object from the second backup image to generate a second hash result; and
    solving the longest common subsequence problem for the first hash result and the second hash result to determine the differences between the first hash result and the second hash result.

4. The method of claim 1 wherein the first and second backup images comprise data that has been backed up from a file system.

5. The method of claim 1 wherein the first backup image is created during a first operation that backs up a file system, and the second backup image is created during a second operation that backs up the file system.

6. The method of claim 5 wherein the first and second operations are consecutive.

7. A method comprising:
    receiving, by a system for analyzing file system events, a first file system object from a first backup image of a file system;
    determining, by the system for analyzing file system events, if the first file system object is located in a second backup image of the file system;
    if the first file system object is not located in the second backup image, then determining that the first file system object was deleted from the file system;
    if the first file system object is located in the second backup image, then applying a hash function to the first file system object from the first backup image to generate a first hash result;
    applying a hash function to the first file system object from the second backup image to generate a second hash result;
    solving the longest common subsequence problem for the first hash result and the second hash result to determine the differences between the first hash result and the second hash result; and
    using the results from the determining and solving steps to generate a model of the file system.

8. The method of claim 7, wherein the second backup image is created after the first backup image.

9. The method of claim 7, wherein the second backup image is created before the first backup image.

10. A computer program product, comprising a non-transitory computer usable medium having a computer readable program code embodied therein, said computer readable program code adapted to be executed to implement a method for analyzing file system events, said method comprising:
    receiving a first backup image of a file system, the first backup image having at least one backed up file system object;
    receiving a second backup image of the file system, the second backup image having at least one backed up file system object, the second backup image created after the first backup image;
    selecting a first file system object from the first backup image;
    comparing the first file system object and a second version of the first file system object to determine the differences if the second version of the first file system object is located in the second backup image, if the second version of the first file system object is not located in the second backup image, then determining that the first file system object was deleted from the file system or was created in the file system at a time interval between a creation of the first backup image and a creation of the second backup image; and
    using the results from the comparing step to generate a model of the file system.

11. A computer program product, comprising a non-transitory computer usable medium having a computer readable program code embodied therein, said computer readable program code adapted to be executed to implement a method for analyzing file system events, said method comprising:
    receiving a first file system object from a first backup image of a file system;
    determining if the first file system object is located in a second backup image of the file system;
    if the first file system object is not located in the second backup image, then determining that the first file system object was deleted from the file system;
    if the first file system object is located in the second backup image, then applying a hash function to the first file system object from the first backup image to generate a first hash result;

applying a hash function to the first file system object from the second backup image to generate a second hash result;

solving the longest common subsequence problem for the first hash result and the second hash result to determine the differences between the first hash result and the second hash result; and using the results from the determining and solving steps to generate a model of the file system.

12. A method for analyzing file system events comprising:

receiving, by a system for analyzing file system events, a first backup image of a file system;

receiving, by the system for analyzing file system events, a second backup image of the file system, the second backup image created after the first backup image;

selecting a first file system object from the first backup image;

if a copy of the first file system object is located in the second backup image, then comparing the first file system object and the copy of the file system object to determine the differences and storing the results in a data structure;

if the first file system object is not located in the second backup image, then determining that the first file system object was deleted from the file system and storing in the data structure the fact that the file system object was deleted; and using the data structure to generate a model of the file system.

13. A method for analyzing file system events comprising:

receiving, by a system for analyzing file system events, a first backup image of a file system;

receiving, by the system for analyzing file system events, a second backup image of the file system, the second backup image created before the first backup image;

selecting a first file system object from the first backup image;

if a copy of the first file system object is located in the second backup image, then comparing the first file system object and the copy of the file system object to determine the differences and storing the results in a data structure;

if the copy of the first file system object is not located in the second backup image, then storing in the data structure the fact that the file system object was created after the first backup image; and using the data structure to generate a model of the file system.

* * * * *